United States Patent

[11] 3,612,543

[72] Inventor Wilbert W. Redmer
Boca Raton, Fla.

[21] Appl. No. 854,918
[22] Filed Sept. 3, 1969
[45] Patented Oct. 12, 1971
[73] Assignee Redmer Sons Company
Franklin Park, Ill.

[54] ADAPTER SPINDLE
9 Claims, 7 Drawing Figs.

[52] U.S. Cl. .......... 274/105
[51] Int. Cl. .......... G11b 17/04
[50] Field of Search .......... 274/10 S, 10 SS

[56] References Cited

UNITED STATES PATENTS

| | | | |
|---|---|---|---|
| 2,706,639 | 4/1955 | Sperber | 274/10 S |
| 2,918,288 | 12/1959 | Van Antuerp | 274/10 S |
| 3,241,838 | 3/1966 | Morrison | 274/10 S |
| 3,273,895 | 9/1966 | Simpson | 274/10 S |
| 3,301,563 | 1/1967 | Simpson | 274/10 S |

*Primary Examiner*—Leonard Forman
*Assistant Examiner*—Steven L. Stephan
*Attorney*—Pendleton, Neuman, Williams & Anderson

ABSTRACT: An adapter spindle for use with phonograph records having a large centerhole, which is adapted to slip over a conventional small diameter center spindle of a record changer. The adapter spindle includes a generally rectangular, flat housing, two retractable record supporting shelves, and a record separator member which controls the records supported by the spindle so only the lowermost record falls to the turntable when the record supporting shelves are retracted.

Inventor
Wilbert W. Bednar
by: Pendleton, Neuman, Seibold & Williams
Atty's

Inventor
Wilbert W. Redmer
by: Pendleton, Neuman, Seibold & Williams
Att'ys

ADAPTER SPINDLE

BACKGROUND OF THE INVENTION

The present invention relates generally to adapter spindles and in particular to a large diameter adapter spindle for use with records having a large centerhole. Such large centerholes are normally used on 45 r.p.m. records.

Adapter spindles for accommodating large centerhole phonograph records, i.e., records with approximately 1.5-inch centerholes, are known in the art. However, the prior art adapter spindles were either too expensive or did not function well. The adapter spindles that functioned satisfactorily usually had round housings and employed at least three parts to achieve record separation and dropping to the turntable. This resulted in high cost for materials and assembly. The flat type of adapter spindle, to which this invention relates, requires less material and is easier to assemble, but heretofore these flat adapter spindles did not provide suitable functioning. For example, these inexpensive adapter spindles had to be removed from the small diameter center spindle of the record changer in order to remove the records from the turntable; or, as shown in Simpson U.S. Pat. 3,273,895, the adapter spindle was constructed with the upper end of the housing offset from the lower end in order to maintain the records in a level condition. This design is more costly and generally dissatisfactory.

Accordingly, it is an object of the present invention to provide an improved adapter spindle which is compact, simply constructed and economical to manufacture in that it requires less material and is easier to assemble. Another object of the invention is to provide an improved adapter spindle having record supporting means and record separating means which insure efficient operation in dropping one record at a time to the turntable of a record player. A still further object is to provide an adapter spindle which does not have to be removed when the records are removed from the turntable. Another object is to provide an adapter spindle which employs a single separator element which achieves in one element all of the movements previously performed by three elements for record separation and dropping to the turntable. Additional objects will become manifest from this specification and the drawings.

SUMMARY OF THE INVENTION

The adapter spindle of this invention includes a generally rectangular, flat housing. A central passage extends longitudinally through the housing and is adapted to receive the small hole record spindle of a record player. Two retractable record supporting shelves project through appropriate openings in the sides of the housing and hold a stack of records in place. A record separator member is mounted within the housing and is adapted for lateral movement. The separator is actuated by the small diameter spindle of the record changer. A lip is provided on one end of the record separator member. When a record is changed, the record separator member is moved laterally so that it slightly displaces the next to lowermost record, and the lip extends out of the housing and supports one side of this record. The other side of the next to lowermost record is held by a stationary shelf provided in the housing. The lowermost record is released and drops to the turntable, and thereafter the separator is moved laterally in the opposite direction so that the lip is retracted. At the same time, the movable record supporting shelves extend out of the sides of the record and the next to lowermost record, which is now the lowermost record, is pushed off the lip and stationary shelf and onto the movable supporting shelves. The mechanism is now ready to release another record.

DESCRIPTION OF THE PREFERRED EMBODIMENT

Figures 1, 2, 3:
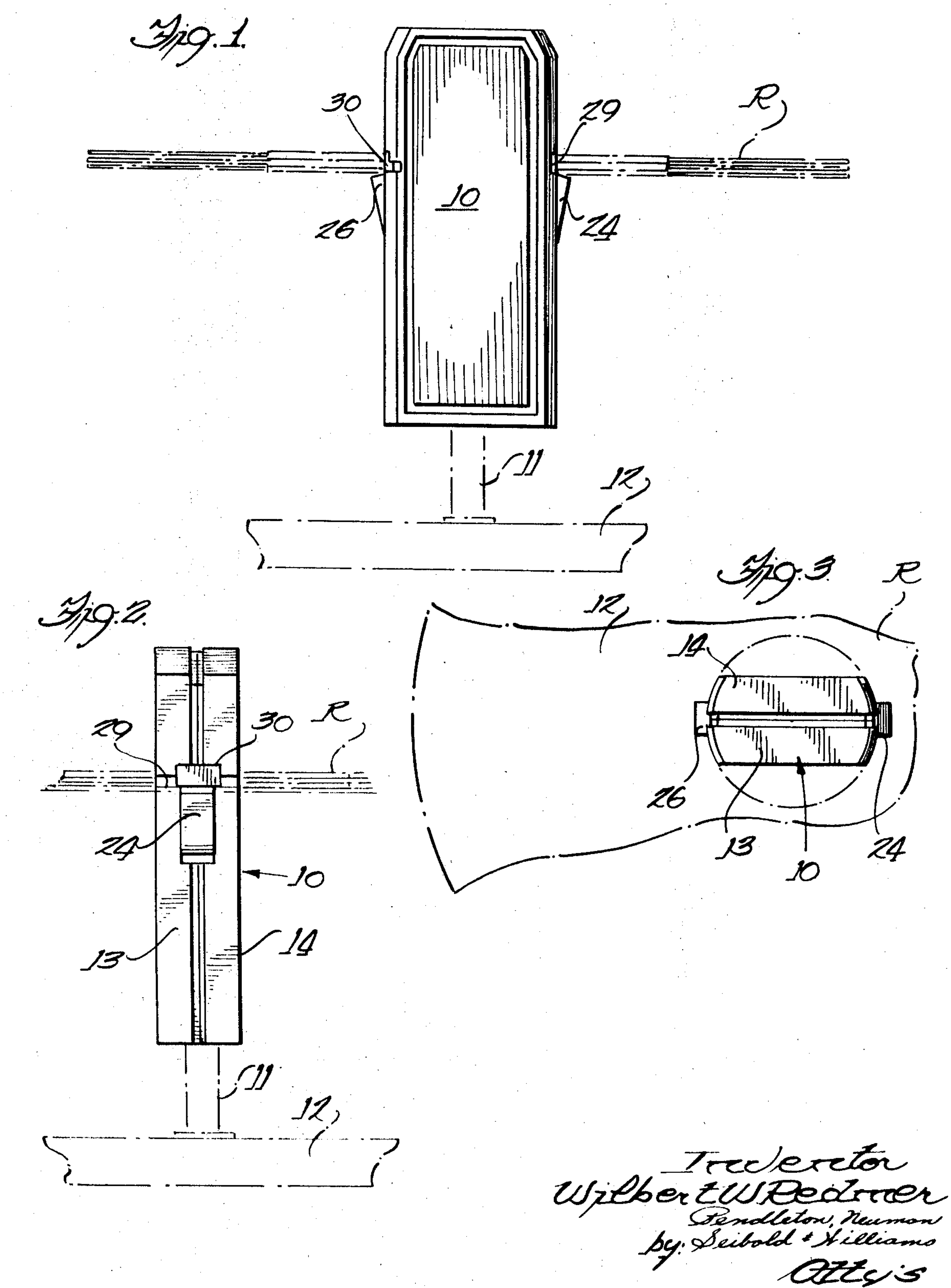
FIG. 1 is a front elevational view of the adapter spindle of the invention mounted in operative position over the small diameter center spindle of a record changer.
FIG. 2 is a view similar to FIG. 1 but showing the adapter spindle in side elevation.
FIG. 3 is a plan view of the apparatus of FIG. 1.
Figures 4, 5, 6, 7:
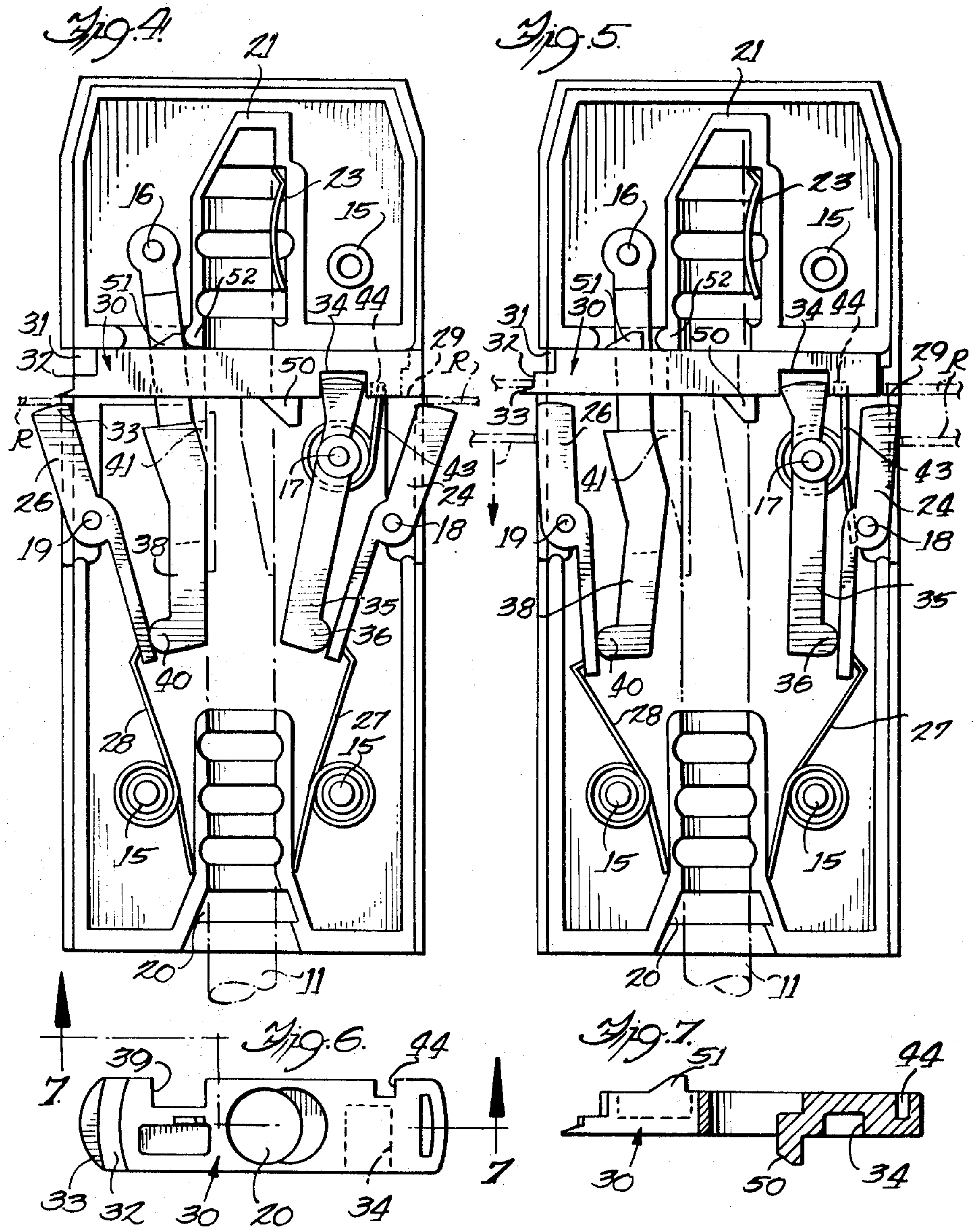
FIG. 4 is an enlarged vertical section of the adapter spindle of FIG. 1 showing the mechanism thereof with the movable record supporting shelves in extended record supporting position.
FIG. 5 is an enlarged vertical sectional view of the adapter spindle of FIG. 1 showing the mechanism thereof with the movable record supporting shelves in retracted position and the separator element in extended position supporting the next to lowermost record and the remaining records on the stack.
FIG. 6 is a plan view of the record separator element employed in the adapter spindle of the invention.
FIG. 7 is a view taken on the line 7—7 of FIG. 6.

FIGS. 1–3 show an adapter spindle 10 mounted over a small diameter center spindle 11 of a record changer so as to support a stack of records R having a large centerhole. The adapter spindle 10 functions to permit one record at a time to drop to the turntable 12. The adapter spindle housing is formed of two similar generally rectangular parts 13 and 14 suitably secured together. The parts 13 and 14 are of substantially the same dimensions and are the reverse of each other so that they mate together. The sections 13 and 14 can be joined by adhesive or other means, but preferably a plurality of mating female and male projections 15, shown in FIGS. 4 and 5 are used. By virtue of the mating projections 15, the sections 13 and 14 can be easily aligned. Also serving to join and align the sections 13 and 14 are inwardly projecting pivot pins 16, 17, 18 and 19 disposed on section 13 with corresponding female members (not shown) being located on section 14.

Extending longitudinally through the adapter housing is a central passage 20 for receiving a small hole record spindle 11. Passage 20 is formed by two longitudinally extending semicircular portions on the inner walls of housing sections 13 and 14 (one semicircular portion being shown in the drawings). The circumference of passage 20 is only slightly greater than the circumference of spindle 11. The small hole record spindle 11 is prevented from rotating by frictional engagement with leaf spring 23. The upper portion 21 of the passage 20 is tapered to correspond with the top of the spindle 11. In this way the adapter spindle 10 can only be slipped over the spindle 11 in one direction.

Two record supporting shelves 24 and 26 are pivotally mounted on pins 18 and 19, respectively. The record supporting shelves 24 and 26 project through appropriate openings in the sides of the housing when in normally extended position, as shown in FIG. 4. The shelves 24 and 26 are held in this position by the biasing action of springs 27 and 28, respectively, which are mounted on projections 15.

Record separator member 30 is mounted within horizontal passage 31 in the housing, ridges or guides (not shown) being provided on the interior surface of the housing to keep the separator member 30 aligned. The separator member 30 is movable laterally between a retracted position (FIG. 4) and an extended position (FIG. 5). Separator member 30 is provided with a stepped end portion 32 which includes a bladelike lip portion 33. A recess 34 is provided on the bottom of separator member 30 to accommodate an end of arm 35 which is pivotable on pin 17 and which, on the opposite end thereof, is formed with a boss portion 36. A downwardly projecting cam arm 38 pivotally mounted on pin 16 passes through a recess 39 (see FIG. 6) on the side of separator member 30. The relative position of pivot points 16 and 17 permits opposite movement of the arms 35 and 38 when the arms are actuated by the separator member 30. Cam arm 38 is contoured so that it will not interfere with the insertion of spindle 11. The lower end of arm 38 is also provided with a boss portion 40.

Two stops 50 and 51 are provided on the separator member 30. Stop 51 engages a protuberance 52 in the adapter housing part 13 and controls movement of the member 30 to its retracted position (to the right in the drawing). Stop 50 engages the small diameter spindle 11 when the member 30 moves into its extended position (to the left in the drawing), thereby controlling movement in this direction.

The small diameter spindle 11 is conventional in the art and is provided with record ejecting means including an ejector lever 41 movable through a longitudinal slot in the spindle between a projecting position for supporting records and a retracted position for permitting a record to fall to the turntable. The conventional means for operating the ejector lever 41 is known to those skilled in the art.

When the adapter spindle 10 is mounted over a small diameter center spindle of a record changer and in operative position, the shelves 24 and 26 are normally in outwardly extended position as shown in FIG. 4. In this position, the shelves support a stack of records having a large centerhole. Upon actuation of the mechanism of the small diameter center spindle, the record ejector lever 41 moves outwardly and pushes the separator member 30 outwardly (to the left in the drawings). At the same time, the separator member 30 actuates cam arm 38 in a clockwise direction with boss portion 40 causing the shelf 26 to pivot to its retracted position (see FIG. 5). Member 30 also actuates arm 35 to pivot in a counterclockwise direction with the boss portion 36 thereon engaging the lower end of shelf 24 and pivoting the shelf into its retracted position FIG. 5). Both shelves 24 and 26 retract simultaneously so that the lowermost record in the stack is free to fall to the turntable. At the same time, the next to lowermost record is pushed laterally a slight extent to the left in the drawing by the stepped end portion 32 until it is supported by the lip 33 on the separator member 30 and by the shelf 29 formed on the adapter housing. The stepped end portion 32 has a height approximately equal to the inner edge of the record and supports the remaining records in the stack. As the changing mechanism of the record changer completes its cycle, the record ejector lever 41 is retracted and the above operations are reversed. The biasing spring 43, one end of which is received in a recess 44 on separator member 30, forces member 30 to move laterally to the right in the drawing to its retracted position; and simultaneously, biasing springs 27 and 28 move the record supporting shelves 24 and 26, respectively, into the extended outwardly projecting position. The retraction of separator element 30 forces the record off of lip 33 and shelf 29 and onto the record supporting shelves 24 and 26; and the cycle is completed.

Those modifications and equivalents which fall within the spirit of the invention are to be considered a part thereof.

What is claimed is:

1. An adapter spindle for use with phonograph records having large centerholes and with a record changer having a small diameter spindle and record ejecting means in said spindle, said adapter spindle comprising:

- an adapter housing having apertures in opposed sides thereof, a longitudinal passage for receiving the small diameter spindle, and a transverse passage disposed between the apertures therein;
- a record separator element movable within the transverse passage of the housing between an outwardly projecting position and an inner retracted position, said separator element having two ends and record supporting means on one end;
- record supporting elements adapted to move through said housing apertures between an outwardly projecting position and an inner retracted position, said record supporting elements being adapted to support a stack of records when said elements are disposed in their outwardly projecting position;
- means for moving the separator element to its outwardly projecting position in response to movement of said record ejecting means, the record supporting means of said separator element extending through one of said housing apertures and supporting the next to lowermost record at one point along the edge of the centerhole thereof, said record supporting means also being adapted to displace laterally the next to lowermost record of the record stack when the separator member is in its outwardly projecting position and having a lip portion which supports this record when it is laterally displaced;
- means disposed on said housing for supporting the next to lowermost record at a second point along the edge of the centerhole thereof when said separator element is in its outwardly projecting position;
- means for retracting said record supporting elements upon movement of the record separator element into its outwardly extended position;
- means for retracting the record separator element and for moving said record supporting elements to their outwardly projecting position whereby said next to lowermost record is moved onto said record supporting elements; and
- means for maintaining said record supporting elements in an outwardly projecting position when said record separator element is in retracted position.

2. The adapter spindle of claim 1 wherein the means for moving the separator element to its outwardly projecting position include an aperture through which the small diameter spindle passes, the diameter of the aperture being slightly greater than the small diameter spindle and the walls of the aperture being adapted to engage the record ejecting means of said spindle.

3. The adapter spindle of claim 1 wherein the movable record supporting elements comprise pivotable elongated members, each having a pivot point, the upper portion of said members constituting record supporting shelves which normally extend through said apertures in the adapter housing; the means for retracting said shelves include pivotable arms operatively connected to said separator element so that when the latter moves to its outwardly projecting position, the arms are pivoted about their pivot points, engage the lower portion of the elongated members, and rotate the latter about their pivot points so that the upper record supporting shelves are retracted into the adapter housing.

4. The adapter spindle of claim 3 wherein there are two movable record supporting elements and an arm engaging each of said elements, the pivot point of one of said arms being located above the separator element and the pivot point of the other arm being located below said element.

5. The adapter spindle of claim 4 wherein the means for retracting the record separator element and the means for maintaining said record supporting shelves in an outwardly projecting position are biasing springs.

6. The adapter spindle of claim 5 wherein the housing is generally flat and comprises two parts, each of said parts containing a plurality of projections, the projections of one of said parts being adapted to be mated with the projections of the other of said parts whereby the parts may be aligned to form the housing.

7. The adapter spindle of claim 6 wherein said projections include supports for said biasing springs, the pivot points for the elongated members of said record supporting elements, and the pivot points for the pivotable arms operatively connected to said separator element.

8. In an adapter spindle for use with a record changer having a small diameter spindle and record ejecting means in said spindle, which adapter spindle comprises a housing having apertures in opposed sides thereof, a longitudinal passage in the housing for receiving the small diameter spindle, a transverse passage disposed in the housing between the apertures therein, two record supporting elements adapted to move through said housing apertures between an outwardly projecting position and an inner retracted position, said record supporting elements being adapted to support a stack of records when said elements are disposed in their outwardly projecting position, and two pivotable arms adapted to retract the record supporting elements, the improvement comprising: a record separator element disposed in said transverse passage and adapted to move between an outwardly projecting position and an inner retracted position, one end of said separator element being adapted to project out of said housing through one of said apertures therein, said separator element end having means adapted to displace laterally the next to lowermost record when the separator element is in its outwardly projecting position and a lip which supports the next to lowermost record of the record stack when the separator element is in this position.

9. The record separator element of claim 8 wherein the element includes a generally central aperture through which the small diameter spindle passes, a second aperture through which one of said pivotable arms passes, said arm being adapted to pivot about a point above said separator element, and a recess for receiving the other of said pivotable arms, said arm being adapted to pivot about a point below said separator element.